March 14, 1950     S. P. SAVIDES     2,500,620
CUTTING ATTACHMENT FOR DOUGHNUT MACHINES
Filed June 13, 1945
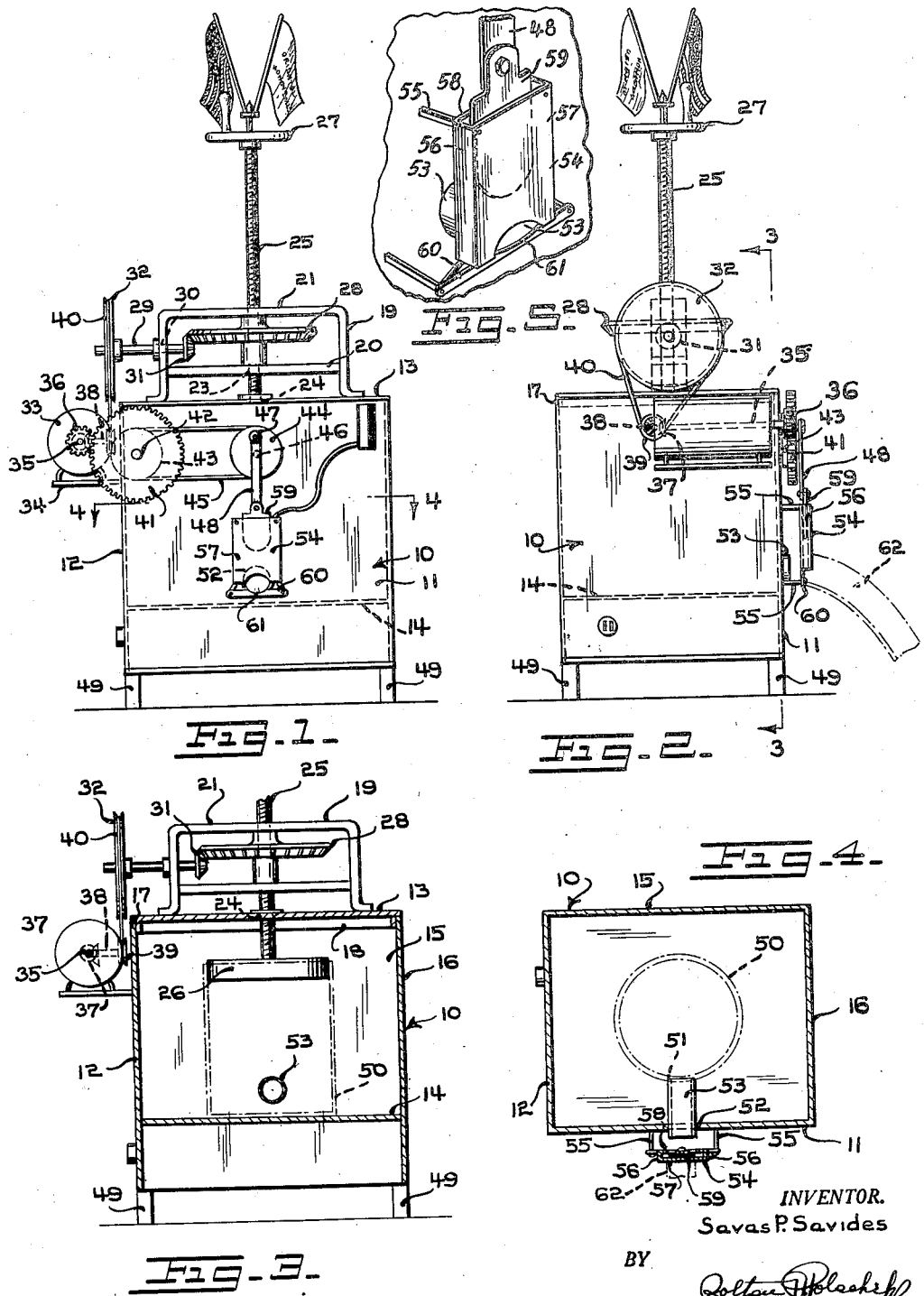
INVENTOR.
Savas P. Savides
BY
ATTORNEY.

Patented Mar. 14, 1950

2,500,620

UNITED STATES PATENT OFFICE 2,500,620

CUTTING ATTACHMENT FOR DOUGHNUT MACHINES

Savas P. Savides, Rockaway Beach, N. Y.

Application June 13, 1945, Serial No. 599,149

3 Claims. (Cl. 107—14)

This invention relates to new and useful improvements in a cutting attachment for a doughnut machine.

More specifically, the present invention proposes the construction of a simple machine for automatically feeding dough to a cutter and for cutting the dough in symmetrical discs suitable for immersion in hot oil for cooking. It is a feature of the present invention that the machine be constructed of few parts, which parts may be of a durable construction, assuring long life and low maintenance.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a front view of a machine constructed in accordance with this invention.

Fig. 2 is a side view of the machine of Fig. 1, viewed from the left thereof.

Fig. 3 is a vertical section on the line 3—3 of Fig. 2, a can being indicated in dot-dash lines.

Fig. 4 is a horizontal section on the line 4—4 of Fig. 1, a can being indicated in dot-dash lines.

Fig. 5 is a perspective view of a portion of the machine including the cutting apparatus.

The doughnut machine, according to this invention, comprises a frame 10 of box-like formation, having a front wall 11, a left side wall 12, a top wall 13, a bottom wall 14, a rear wall 15, and a right side wall 16. The top wall 13 is removable, being pivotally attached by hinges 17 to the left side wall 12 and having a depending flange 18 fitting in the interior of the box-like frame.

A U-shaped bracket 19 is fastened to the top wall, as by welding. A bar 20 bridges the sides of the bracket 19 between the top 21 of the bracket and the top wall 13. The top 21 has an orifice 22 at its middle in line with an orifice 23 in the bar 20 and an orifice 24 in the top wall 13. The orifice 23 is threaded. A screw 25 is disposed in these orifices and threaded in the orifice 23. The screw depends into the interior of the frame and has a head 26 secured to its inner end. It also extends above the bracket 19 and has a handle 27 on its upper end.

A large bevel gear 28 is threaded on the screw 25 and engages the bottom face of the top 21 of the bracket 19. A horizontal shaft 29 is journalled in an orifice 30 in a side wall of the bracket 19. A bevel gear 31 is secured to the inner end of shaft 29. Gear 31 is much smaller than gear 28 and meshes therewith.

A large pulley 32 is secured to the outer end of shaft 29. An electric motor 33 is mounted on a shelf 34 secured to wall 12. The motor has a shaft 35. A small gear 36 is secured to the front end of shaft 35, and a bevel gear 37 is secured to the rear end. A small shaft 38 is journalled in the rear wall of the motor and driven from the gear 37 by a similar bevel gear. At the other end of shaft 38 there is a small pulley 39 connected to pulley 32 by a belt 40. Thus pulley 32 is driven by pulley 39, which is driven by the motor. The belt 40 permits the top wall 13 to be swung around its hinges 17 without disconnecting the pulleys. This, of course, will only be done when the motor is not running.

A large gear 41 is mounted on a shaft 42 journalled on the front wall 11, the gear 41 meshing with the gear 36 to be driven thereby. A pulley 43 is mounted on a shaft 42 inwardly of gear 41, and this pulley 43 drives a pulley 44 by a belt 45, pulley 44 being mounted on a shaft 46 also journalled on the front wall 11. The pulley 44 has a crank pin 47 from which a link 48 pivotally depends.

The bottom wall 14 of the box-like frame is somewhat above the bottom of the frame, which stands on four legs 49. A can indicated by the dot and dash lines 50 in Figs. 3 and 4, is adapted to be supported on the bottom wall 14. Can 50 is a conventional can for holding dough for making doughnuts, except that it is provided with a round orifice 51 in one side near the bottom thereof. The front wall 11 has a round orifice 52 in line with orifice 51 when the can is supported at the center of the bottom wall 14, and a short extrusion tube 53 is secured in this orifice 52, tube 53 extending into the interior of the box-like frame and being adapted to fit in the orifice 51, and extending a short distance forward of the front wall 11.

A cutting apparatus for cutting discs of dough passing through the tube 53 is provided. This apparatus includes a guide 54 rectangular in cross section, secured to the front wall 11 in slightly spaced relation therewith by legs 55. The guide is open at its top and bottom, but has side walls 56 and a front wall 57 and a rear wall 58. A vertically slidable knife 59 is mounted for reciprocation in the guide. The knife has a rounded sharp bottom edge. At its top it is pivotally connected to the bottom of the link 48. A cutting blade 60 is secured to the legs at the bottom of the guide for coaction with the knife 59, this cutting blade has a concave recess 61 in its cutting edge at the top center thereof. The can 50 has an inside diameter similar to the outside diameter of the head 26 so that the can acts as a cylinder and the head as a piston.

The operation of the device is as follows:

The can is filled almost full with doughnut batter or dough and placed in the center of the bottom wall 14. The screw at this time will be in its uppermost position and the top wall 13 swung back out of the way, leaving the top of the frame open for the insertion of the can. The wall is then swung down around its hinges and the handle 27 turned manually until the head 26 presses lightly against the batter in the can. When the handle 27 is turned manually the screw turns in the gear 28 which is held against motion by the electric motor, which is not running. Bar 20 provides a bottom support for the gear 28. The motor is then started and the machine thereafter works automatically.

The electric motor effects simultaneous rotation of gear 28 and pulley 44. Gear 28 rotating is held from downward movement by the gear 31 and from upward movement by the bracket 19. Thus it acts as a nut, causing the screw 25 to move downward. Simultaneously, pulley 44 causes the knife 59 to move downward and upward in regular repeated cycles. Shaft 25 by moving downward, presses the head 26 against the batter and extrudes the batter through the tube 53 in a cylindrical ribbon. The knife 59 cuts through this ribbon successively cutting small thin discs therefrom as the knife drops and raises. The knife and head 26 are synchronized so that the batter will be extruded at a rate suitable for the cutting cycles of the knife. Each time the knife cuts a disc from the ribbon of batter, the disc will fall into a greased conveyor 62, which will lead it to a pot of boiling fat in spherical form where the sphere will be cooked into a doughnut.

The knife in moving downward, coacts with the blade 60 in cutting the dough, the blade 60 at its recess 61 cutting through the bottom of the ribbon of dough.

When the head has reached the bottom of the can and all the dough is extruded, the motor is stopped and the screw is retracted (raised) by turning the handle 27 manually, whereupon the machine is ready to repeat the operation. If desired the screw may be retracted by reversing the electric motor.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a doughnut machine having a box-like frame housing a can for doughnut dough and having an opening adjacent its bottom end aligned with an opening in the front wall of the frame and means for continually feeding the dough within the can through the bottom opening of the can, an extrusion tube having one end inserted into the opening of the can and its other end projected through the opening of the front wall and extended slightly beyond the front face of the front wall for conveying the dough forced through the opening in the can to the exterior of the frame, a cutting blade fixedly mounted on the front wall adjacent one side of the extended end of said tube, a guide for a knife fixedly mounted on the front wall of the frame on the side of the extended end of said tube diametrically opposite the cutting blade, a knife slidable in said guide to be successively moved toward and away from said cutting blade to cooperate with the cutting blade to intermittently cut thin discs of dough from the cylindrical ribbon of dough discharging from the tube, and means for alternately moving said knife toward and away from said cutting blade.

2. In a doughnut machine having a box-like frame housing a can for doughnut dough and having an opening adjacent its bottom end aligned with an opening in the front wall of the frame and means for continually feeding the dough within the can through the bottom opening of the can, an extrusion tube having one end inserted into the opening of the can and its other end projected through the opening of the front wall and extended slightly beyond the front face of the front wall for conveying the dough forced through the opening in the can to the exterior of the frame, a cutting blade fixedly mounted on the front wall adjacent one side of the extended end of said tube, a guide for a knife fixedly mounted on the front wall of the frame on the side of the extended end of said tube diametrically opposite the cutting blade, a knife slidable in said guide to be successively moved toward and away from said cutting blade to cooperate with the cutting blade to intermittently cut thin discs of dough from the cylindrical ribbon of dough discharging from the tube, and means for alternately moving said knife toward and away from said cutting blade, said moving means comprising a continuously driven pulley mounted on the front wall of the box-like frame, a crank pin extending eccentrically from said pulley, and a link having one end pivotally attached to said crank pin and its other end pivotally attached to said knife to move said knife as the pulley rotates.

3. In a doughnut machine having a box-like frame housing a can for doughnut dough and having an opening adjacent its bottom end aligned with an opening in the front wall of the frame and means for continually feeding the dough within the can through the bottom opening of the can, an extrusion tube having one end inserted into the opening of the can and its other end projected through the opening of the front wall and extended slightly beyond the front face of the front wall for conveying the dough forced through the opening in the can to the exterior of the frame, a cutting blade fixedly mounted on the front wall adjacent one side of the extended end of said tube, a guide for a knife fixedly mounted on the front wall of the frame on the side of the extended end of said tube diametrically opposite the cutting blade, a knife slidable in said guide to be successively moved toward and away from said cutting blade to cooperate with the cutting blade to intermittently cut thin discs of dough from the cylindrical ribbon of dough discharging from the tube, and means for alternately moving said knife toward and away from said cutting blade, said guide comprising a rectangular member open at its ends and having one open end positioned adjacent the extended end of said tube and supported at a distance from the front wall by legs so that the knife will be extended from the open end thereof adjacent the extended end of said tube to move across the extended end of said tube.

SAVAS P. SAVIDES.

REFERENCES CITED

The following references are of record in the file of this patent:

UNITED STATES PATENTS

| Number | Name | Date |
|---|---|---|
| 460,220 | Sautter | Sept. 29, 1891 |
| 1,292,962 | Kennedy | Apr. 1, 1919 |
| 1,444,041 | Schulz et al. | Feb. 6, 1923 |
| 1,881,126 | Parr | Oct. 4, 1932 |
| 1,955,342 | Pizzini et al. | Apr. 17, 1934 |
| 2,191,286 | Morris | Feb. 20, 1940 |
| 2,351,493 | Curry | June 13, 1944 |

FOREIGN PATENTS

| Number | Country | Date |
|---|---|---|
| 219,319 | Germany | Feb. 24, 1910 |